(12) United States Patent
Hanya

(10) Patent No.: US 7,025,102 B2
(45) Date of Patent: Apr. 11, 2006

(54) PNEUMATIC TIRE

(75) Inventor: Masahiro Hanya, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 18 days.

(21) Appl. No.: 10/429,703

(22) Filed: May 6, 2003

(65) Prior Publication Data

US 2003/0209302 A1    Nov. 13, 2003

(30) Foreign Application Priority Data

May 10, 2002    (JP)    ............... 2002-136043

(51) Int. Cl.
*B60C 15/00*    (2006.01)
*B60C 13/02*    (2006.01)

(52) U.S. Cl. .................. 152/539; 152/523; 152/544

(58) Field of Classification Search ............... 152/523, 152/539, 544

See application file for complete search history.

(56) References Cited

U.S. PATENT DOCUMENTS 3,983,918 A    10/1976    French

FOREIGN PATENT DOCUMENTS

| EP | 0 983 875 A2 | 3/2000 |
|---|---|---|
| EP | 0 983 875 A3 | 3/2000 |
| JP | 55091409 | 11/1980 |
| JP | 10-244815 | 9/1998 |
| JP | 11-78441 A | 3/1999 |
| JP | 11268507 | 5/1999 |

*Primary Examiner*—Jeff H. Aftergut
*Assistant Examiner*—Justin R. Fischer
(74) *Attorney, Agent, or Firm*—Birch, Stewart, Kolasch & Birch, LLP

(57) ABSTRACT

A pneumatic tire which comprises a tread portion, a pair of bead portions adapted to a wheel rim, a pair of sidewall portions therebetween, at least one of the sidewall portions provided with an axially protruding rim protector, the rim protector extending continuously in the tire circumferential direction so as to form an annular axially outer surface extending continuously in the tire circumferential direction and a radially inner surface extending radially inwardly from said annular axially outer surface towards the adjacent bead portion, wherein the radially inner surface is provided along the tire circumferential direction with at least one recess having a depth of from 0.5 to 7.0 mm.

7 Claims, 6 Drawing Sheets

PNEUMATIC TIRE

The present invention relates to a pneumatic tire, more particularly to an axially protruding protector for a rim flange.

In recent years, low profile tires are widely used in various vehicles, e.g. passenger car, recreational vehicle, etc. and also even in heavy duty vehicles. In case of passenger car tires in particular, very low profile tires whose aspect ratio reaches to under 50% or 45% are used nowadays.

In such a very low profile tire, as the section height of the tire is low, the flanges of the wheel rim come close to the road surface. Therefore, there is a high possibility that the rim flanges contacts with objects on the road surface such as gravel stones, rocks and reflectors called cat's-eye during running especially during cornering.

The very low profile tires are therefore, generally provided with a rim protector RP protruding axially beyond the rim flange RF as shown in FIG. 8. Thus, the rim protector also prevents the rim flange RF from contacting with a curb E.

Such rim protector RP is made of massive rubber and thus unfavorably increases the tire weight. For example, in case of a 215/45R17 radial tire for passenger car, the increase in the tire weight reaches to about 250 to 300 grams. As a result, not only the fuel efficiency is lowered but also the steering stability is deteriorated because such an increase occurs in the unsprung mass of the car.

On the other hand, between the rim protector RP and rim flange RF, there is a gap G as shown in FIG. 9, and there is another problem of stone entrapment, namely, small objects (s) such as stone are entrapped in the gap G, and the bead portion and rim flange are damaged by entrapped objects during running.

It is therefore, an object of the present invention to provide a pneumatic tire, in which the problem of stone entrapment is solved, and the increase in the tire weight is minimized without deteriorating its function or rim protection.

According to the present invention, a pneumatic tire comprises
a tread portion,
a pair of bead portions adapted to a wheel rim,
a pair of sidewall portions therebetween, at least one of the sidewall portions provided with an axially protruding rim protector,
the rim protector extending continuously in the tire circumferential direction so as to form
an annular axially outer surface extending continuously in the tire circumferential direction and
a radially inner surface extending radially inwardly from the annular axially outer surface towards the adjacent bead portion, wherein the radially inner surface is provided along the tire circumferential direction with at least one recess having a depth of from 0.5 to 7.0 mm.

Therefore, although the rim protector is provided, an excessive increase in the bending rigidity of the lower sidewall can be prevented by the recess, and the holding power for the entrapped objects is decreased. As a result, the objects are relatively easily discharged by repeated deformation and centrifugal force during running. On the other hand, the unfavorable increase in the unsprung mass can be suppressed by the recess. Further, the recess makes it possible to avoid an abrupt change (increase) in the lateral stiffness or rigidity after the bead portion contact with the rim flange due to a large lateral acceleration during cornering or the like. As a result, the steering stability can be improved. Furthermore, the recess improves heat radiation from the inside of the rubber rim protector to improve the high-speed durability.

Embodiments of the present invention will now be described in detail in conjunction with the accompanying drawings.

Figure 1:
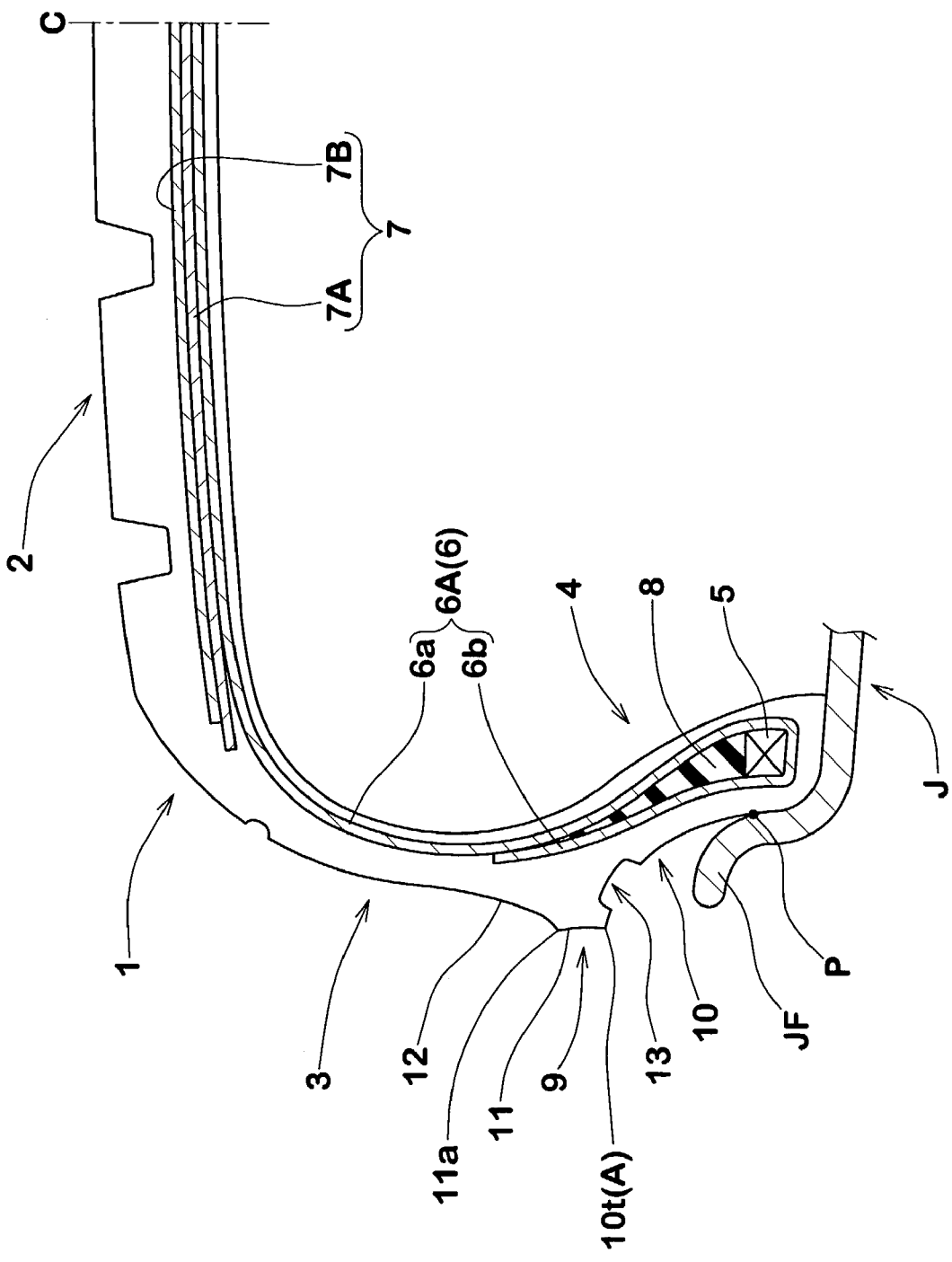
FIG. 1 is a cross sectional view of a pneumatic tire according to the present invention under the undermentioned normally inflated unloaded state of the tire.

In the drawings, pneumatic tire 1 according to the present invention comprises a tread portion 2, a pair of axially spaced bead portions 4 each with a bead core 5 therein, a pair of sidewall portions 3 extending between the tread edges and the bead portions 4, a carcass 6 extending between the bead portions 4, and a belt structure 7 disposed radially outside the carcass 6 in the tread portion 2.

The aspect ratio (tire section height/tire section width) is not more than 50%.

In this embodiment, the pneumatic tire 1 is a passenger car radial tire whose aspect ratio is 45%.

The carcass 6 comprises at least one ply (in this example only one ply 6A) of cords arranged radially at an angle of 90 to 80 degrees with respect to the tire equator C, and extending between the bead portions 4 through the tread portion 2 and sidewall portions 3, and turned up around the bead core 5 in each bead portion 4 from the inside to the outside of the tire so as to form a pair of turned up portions 6b and a main portion 6a therebetween.

As to the material of the carcass cords, organic fibers such as polyester, nylon, rayon and the like are preferably used, but a steel cord may be also used.

The belt structure comprises a breaker 7 and optionally a band on the radially outside of the breaker.

The breaker 7 comprises two cross plies 7A and 7B each made of high modulus cords such as steel cord laid parallel with each other at an angle of from 10 to 40 degrees with respect to the tire equator.

The band is disposed on the radially outside of the breaker 7 so as to cover at least the edge portions of the breaker, the band is made of at least one cord laid at almost zero angle or a small angle with respect to the circumferential direction of the tire. Preferably, the band is formed by spirally winding at least one organic fiber cord, e.g. nylon and the like, at an angle of not more than 5 degrees with respect to the tire equator.

The bead portions 4 are each provided with a bead apex 8 between the carcass turned up portion 6b and main portion 6a. The bead apex 8 is formed of hard rubber extending radially outwardly from the bead core 5 while tapering towards its radially outer end.

In this embodiment, the sidewall portions 3 are each provided with a rim protector 9 to overhang one of two flanges JF of a wheel rim J. It is however also possible to provide a rim protector 9 for only one of the sidewall portions 3 which is intended to be positioned on the outside of the vehicle.

The rim protector 9 extends continuously in the tire circumferential direction and axially protrudes beyond the rim flange JF when the tire 1 is mounted on the wheel rim J and inflated to the standard pressure (hereinafter, the "normally inflated state" of the tire).

Here, the wheel rim J is a design rim which may be a rim officially approved for the tire by a standard organization, i.e. JATMA (Japan and Asia), T&RA (North America), ETRTO (Europe), STRO (Scandinavia) and the like, namely, "Standard rim" in JATMA, "Design Rim" in TRA, "Measuring Rim" in ETRTO and the like. The standard pressure is the "maximum air pressure" in JATMA, the "Inflation Pressure" in ETRTO, the maximum pressure given in the "Tire Load Limits at various cold Inflation Pressures" table in TRA or the like. In case of passenger car tires, however, 180 kPa is used as the standard pressure.

Under the normally inflated, unloaded state of the tire, the axial distance (L1) between the axial extreme end (A) of the rim protector 9 and the axial extreme end JFa of the rim flange JF is set in the range of not more than 10 mm, more preferably less than 7 mm but more than 2 mm. The distance L1 of over 10 mm is not preferable from a point of view of the tire weight, tire width and the like.

The rim protector 9 is provided with an annular surface 11 which is intended to bump or rub against the curbs and the like. In this embodiment, the annular surface 11 is substantially parallel with the tire equatorial plane C. The annular surface 11 is formed as a smooth flat surface in order to increase the resistance to tear-off, crack, wear and the like when bumping or rubbing.

At the radially outer edge 11a and the radially inner edge 10t of the annular surface 11, the annular surface 11 connects with a radially outer surface 12 and inner surface 10 of the rim protector 9, respectively, forming obtuse angled corners therebetween.

The radial distance L2 between the inner edge 10t of the surface 11 and the radial extreme end JFb of the rim flange JF is set in the range of from 2 to 15 mm, preferably 5 to 10 mm. If the distance L2 is less than 2 mm, as the distance between the rim protector 9 and rim flange JF is small, heat generation and wear of the rim protector 9 increase due to the repetition of contact during running and further stone entrapment is liable to occur therebetween. If the distance L2 is more than 15 mm, effective protection of the rim flange is difficult.

The radially outer surface 12 of the rim protector 9 is, in the tire meridian section, defined by a concave curve which merges into a convex curve of the upper sidewall.

On the other hand, the radially inner surface 10 is defined as having: an outer edge (=10t, which is the extreme end in the axial and radial directions) positioned at an axial distance (=L1) of more than 0 mm but not more than 10 mm from the axial extreme end JFa of the rim flange JF; and an inner edge at a point P at which this surface 10 separates from the rim flange. In this embodiment, the radially inner surface 10 is defined as extending from the point P to the above-mentioned edge 10t. The edge 10t is the axial extreme end (A) of the rim protector 9.

The rim protector 9 is provided in the radially inner surface 10 with at least one recess 13 along the circumferential direction of the tire.

The depth (d) of the recess 13 is set in the range of from 0.5 to 7.0 mm, preferably 1 to 5 mm, more preferably 2 to 4 mm. If the depth (d) increases over 7.0 mm, it becomes difficult to obtain the minimum rigidity for the rim protector 9, and rubber tearing-off, cracks and the like are liable to occur on the rim protector 9.

Figure 2A:
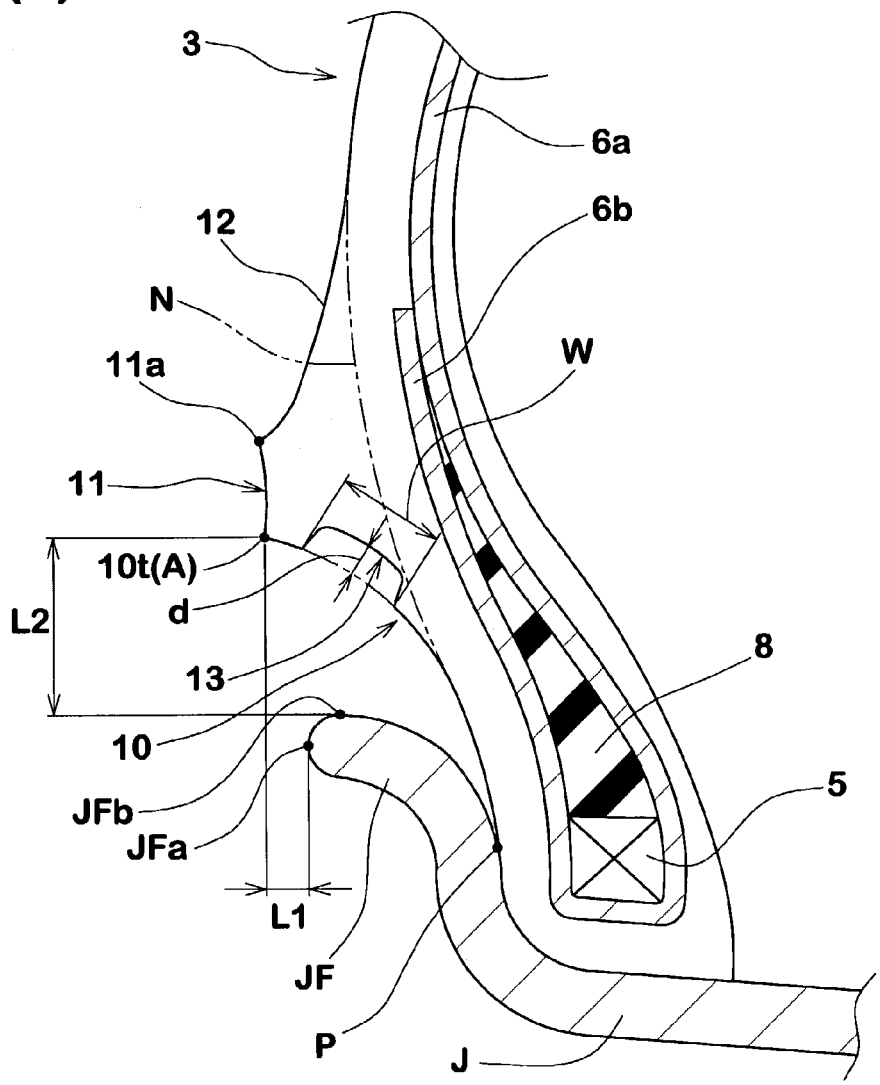
FIG. 2(a) is an enlarged cross sectional view of the rim protector thereof under the normally inflated, unloaded state.

The total volume vg of the recess(s) 13 is set in the range of from 0.05 to 0.3 times, preferably 0.1 to 0.2 times the volume Va of the rim protector 9, wherein, as shown in FIG. 2(a), the volume Va of the rim protector 9 is defined as that of rubber part axially outside a line N drawn from the above-mentioned separating point P in parallel with the axially outer surface of the carcass 6.

Preferably, the recess(es) 13 is (are) disposed radially outside the radial extreme end JFb of the rim flange JF and do not extend beyond the line N.

It is preferable that, when the tire is subjected to a large lateral acceleration, the separating point P gradually moves toward the radially outside as the inclination of the lower sidewall portion increases. Such gradual contact prevents an abrupt change in the tire lateral stiffness. Thus, controllability can be maintained even at the time of critical cornering, and the steering stability is effectively improved.

In order to realize and help such gradual contact, the radially inner surface 10 of the rim protector 9 is provided with the following specific profile.

Figure 3:
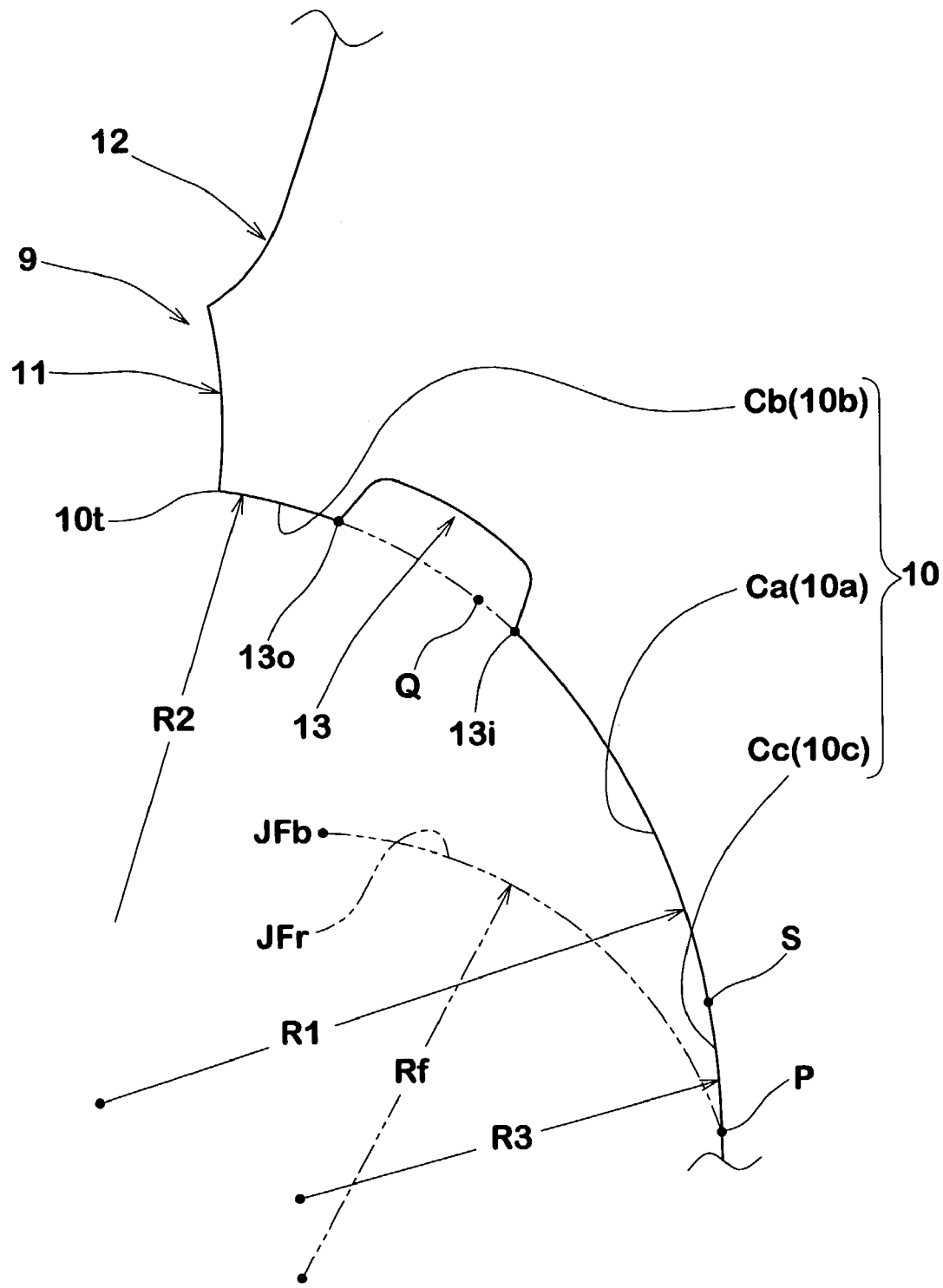
FIG. 3 is a profile line of the rim protector in the tire meridian section under the normally inflated, unloaded state.
Figure 4:
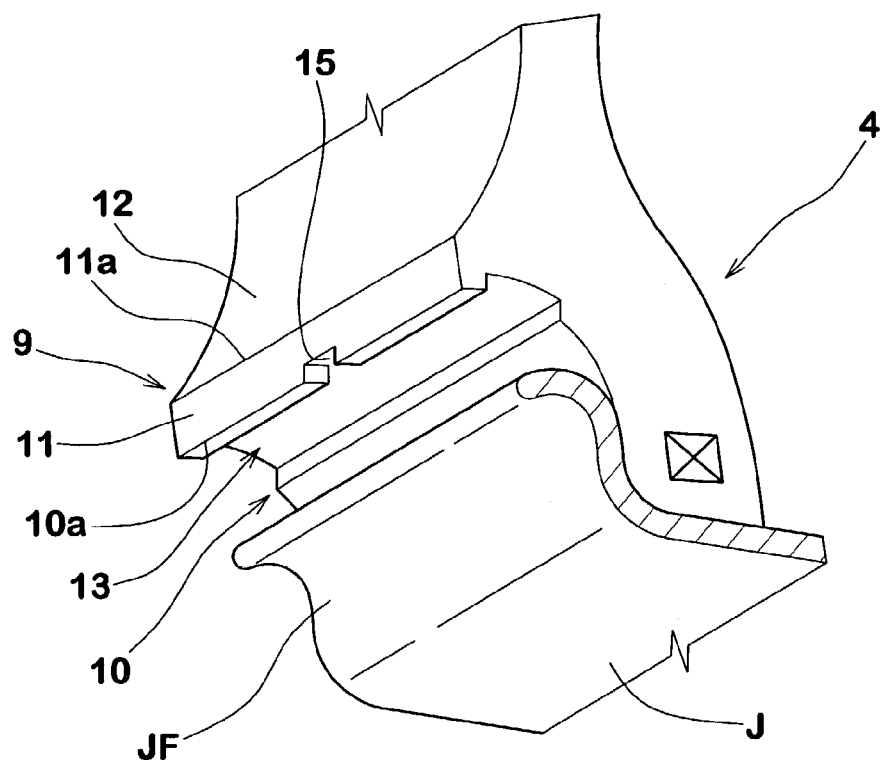
FIG. 4 is a perspective view of the rim protector provided with a groove-type recess.

FIG. 3 shows the contour of the radially inner surface 10 in this embodiment, wherein the inner surface 10 comprises three parts 10c, 10a, 10b. The radially inner part 10c extends from the above-mentioned separating point P to a radially outer point S. The middle part 10a extends from the point S to a radially outer point Q. The radially outer part 10b extends from the point Q to the above-mentioned edge 10t. In practice, however, in case the point Q is located in the single recess 13 as shown in FIG. 4, the middle part 10a extends to the radial inner edge 13i of the recess 13, and the radially outer part 10b extends from the radial outer edge 13o of the recess 13.

Figure 2B:
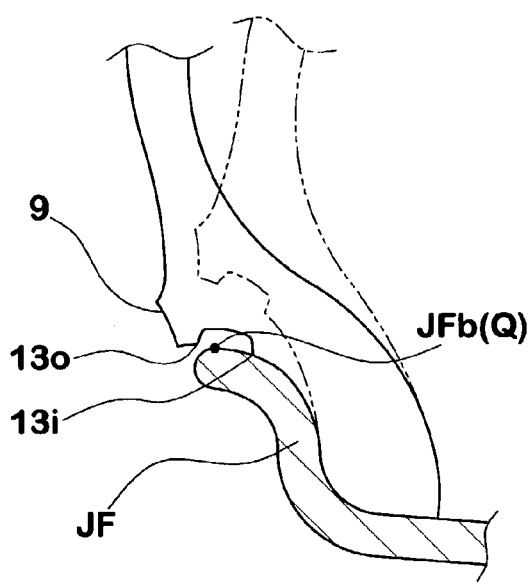
FIG. 2(b) is a schematic cross sectional view showing the rim protector contacting with the rim flange under load.

Here, the point Q is a point which substantially corresponds to the radial extreme end JFb of the rim flange JF when the inner surface 10 comes into contact with the rim flange by tire loading as shown in FIG. 2(b).

In the meridian section of the tire under the normally inflated unloaded state of the tire, the middle part 10a, outer part 10b and inner part 10c are defined by circular arcs Ca, Cb and Cc having radii R1, R2 and R3, respectively, wherein the radius R1 is larger than the radius Rf of curvature of the convex surface JFr of the rim flange JF, and the radii R2 and R3 are smaller than the radius R1.

Preferably, the radius R1 is set in the range of not less than 2 times, more preferably 2.0 to 4.0 times, still more preferably 2.5 to 4.0 times the rim-flange radius Rf.

The radii R2 and R3 are each set in the range of from 0.5 to 2.5 times, preferably 1.0 to 2.0 times the rim-flange radius Rf. In this embodiment, the following relationship comes into existence: $R1 > R2 > R3 \geq Rf$.

By setting the radius R3 as above, at the initial stage of cornering, the inner part 10c contacts with the rim flange almost at once, and the responsiveness to cornering can be improved. After the contact of the inner part 10c, owing to the radius R1 limited as above, the middle part 10a gradually contacts from the radially inside to the outside. Thus, the apparent rigidity against axially outward bending or tire stiffness shows a nonlinear but non-abrupt increase and controllability will be maintained even at the time of critical cornering.

Figure 5:
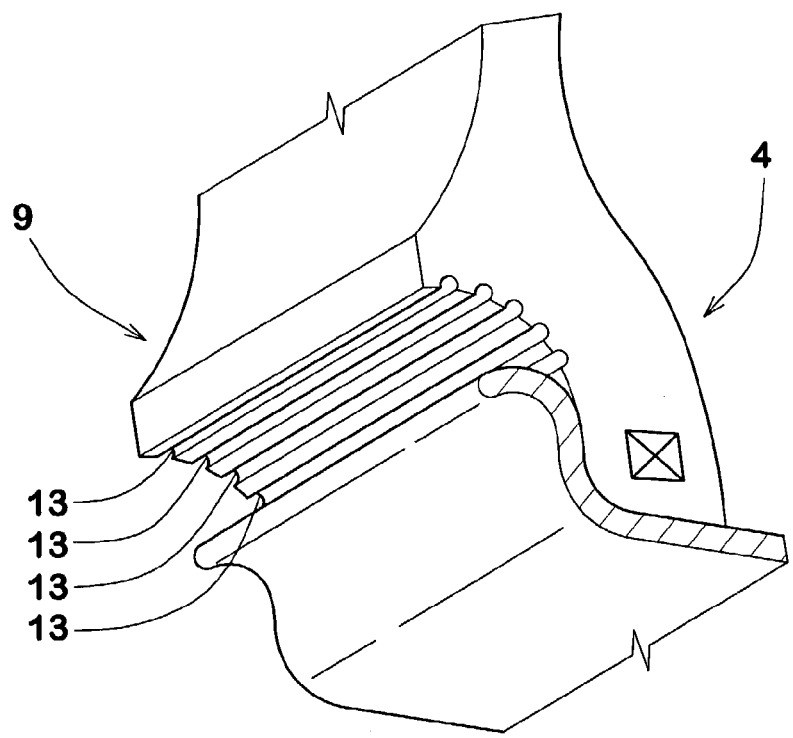
FIG. 5 is a perspective view of another example of the rim protector provided with a plurality of groove-type recesses.

FIGS. 4 and 5 each show an embodiment in which the rim protector 9 is provided with a groove-type recess 13. In FIG. 4, a single groove extending continuously in the tire circumferential direction is provided as a circumferentially continuous recess 13.

In FIG. 5, a plurality of parallel grooves each extending continuously in the tire circumferential direction are provided as a circumferentially continuous recesses 13. Preferably, all the recesses 13 are disposed radially outside the radial extreme end JFb of the rim flange JF as explained above.

In these embodiments, the depth (d) of a groove-type recess 13 is constant along the length thereof, but it may be varied in the tire circumferential direction. Further, in case of a plurality of groove-type recesses, the depth may be changed between the grooves. For example, in case of three or more grooves, the depths may be gradually increased towards the central groove from the radially inner and outer grooves. In any case, the depth (d) of each groove is limited as described above, and the total groove width is set in the range of from 3 to 15 mm, preferably 5 to 7 mm.

As to the sectional shape of the groove, a rectangle with rounded corners (FIGS. 2 and 3), arc, semi circle, U-shape and the like may be used.

When the radially inner edge 13i comes into contact with the rim flange as shown in FIG. 2(b), the radially outer edge 13o is not contact and positioned radially and axially outside the radial extreme end JFb. Such a dimensional arrangement is preferred because abrupt change (increase) in the apparent bending rigidity of the lower sidewall after the contact can be avoided. Thus, controllability during cornering especially at the time of critical cornering can be maintained.

When the recess 13 is a circumferentially continuous groove, a plurality of radial grooves 15, which extend from the groove-type recess 13 to the axially outer surface 11 as shown in FIG. 4, may be provided. As to the number or circumferential pitches of the radial grooves 15, it is preferable that at least one radial groove 15 always exists in a sector region corresponding to the ground patch in order to prevent retention of water.

Figure 6:
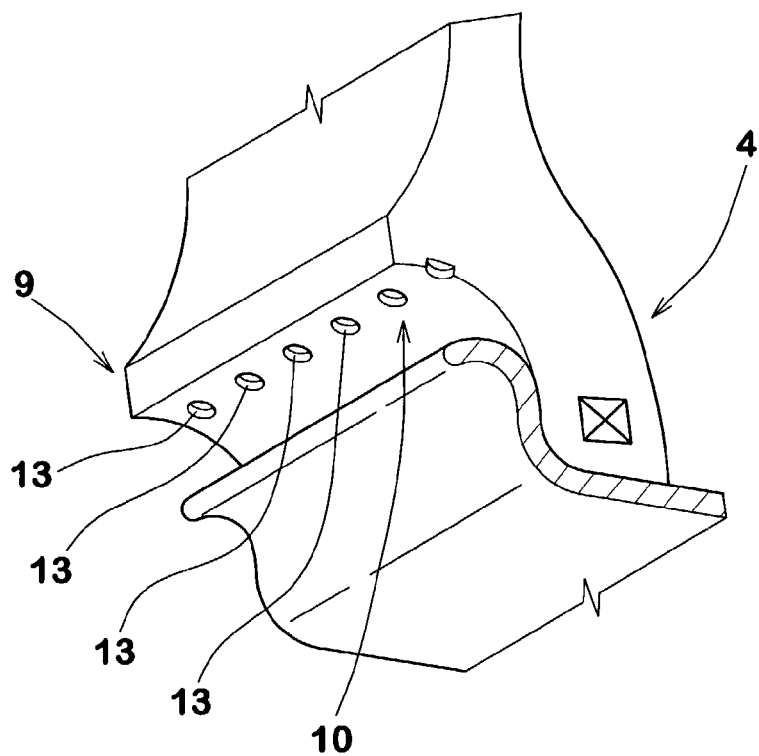
FIG. 6 is a perspective view of another example of the rim protector provided with a plurality of hole-type recesses.
Figure 7:
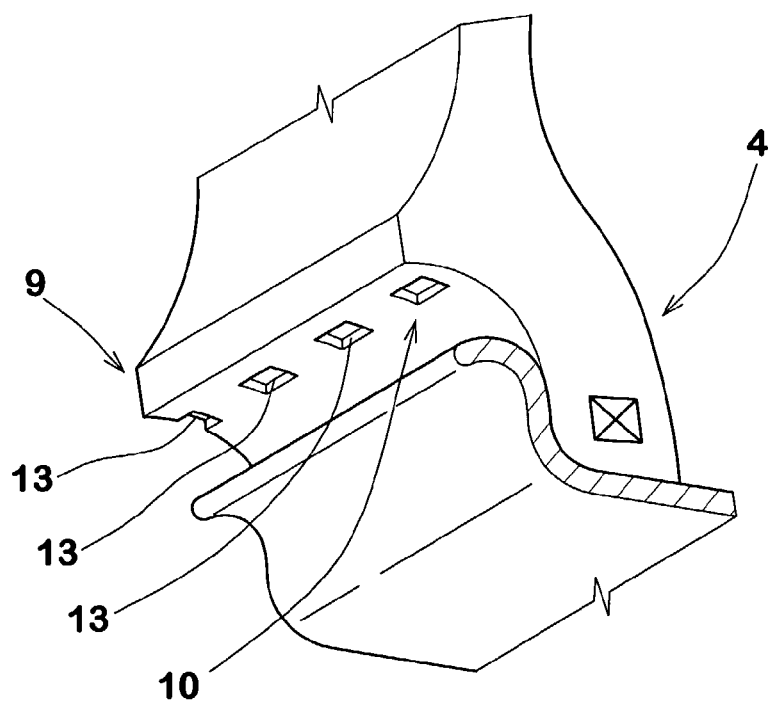
FIG. 7 is a perspective view of another example of the rim protector provided with a plurality of hole-type recesses.
Figure 8:
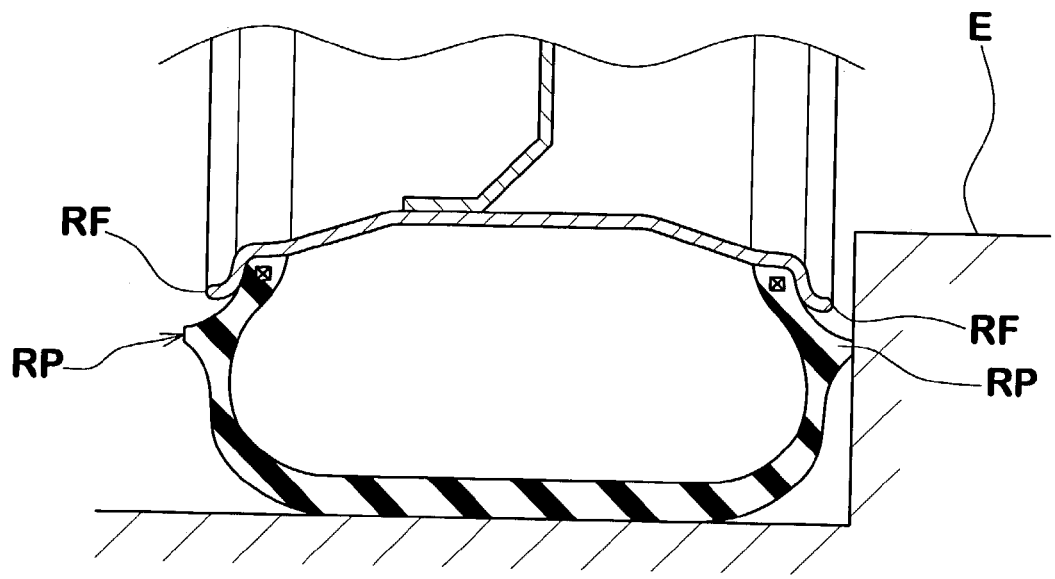
FIG. 8 is a cross sectional view showing a conventional rim protector.
Figure 9:
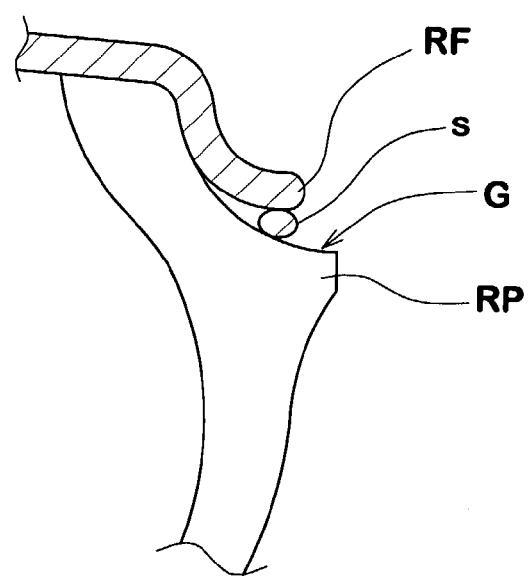
FIG. 9 is a cross sectional view for explaining stone entrapment.

FIG. 6 and FIG. 7 each show another embodiment in which the rim protector 9 is provided with a series of circumferentially spaced hole-type recesses 13.

The hole-type recesses 13 are arranged at a constant circumferential pitch in the range of 10 to 30 mm, more preferably 10 to 15 mm. Preferably, the area of the opening of one recess 13 is set in the range of 1 to 50 sq.mm, more preferably 10 to 30 sq.mm. As to the shape of the opening, various shapes such as a circle as shown in FIG. 6 and a rectangle as shown in FIG. 7 may be used. In the hole-type case too, similar to the groove-type, the corner at the bottom is preferably rounded. In the tire meridian section, the total size of the hole-type recess(es) 13 along the inner surface 10 (which corresponds to the above-mentioned total groove width) is set in the range of from 3 to 15 mm, preferably 5 to 7 mm. The depth (d) of each hole-type recess 13 can be limited as above.

As a further embodiment of the present invention, a combination of the groove-type and hole-type recess is possible Comparison Tests Test tires of size 215/45R17 (rim size 17×7-JJ) having the same internal structure shown in FIG. 1 were made and tested for the steering stability and stone entrapment as sollows.

1) Tire Weight

The weight of the tire is indicated by an index based on Ref tire being 100, wherein the smaller the index number, the lighter the weight.

2) Stone Entrapment Test

A test car, Japanese passenger car provided on the front wheels with test tires (pressure 230 kPa) was run on a gravel road at a speed of 40 km/h for a distance of 10 km, and then the number of stones entrapped between the rim protector and rim flange was counted. This test was conducted ten times per each tire to obtain the mean value for the ten-time's counts. The results are indicated in Table 1 by an index based on Ref. tire being 100, wherein the smaller index number shows the less stone entrapment.

3) Steering Stability Test

The above-mentioned test car performed critical cornering on a dry asphalt road in a tire test course, and the steering stability was evaluated by the test driver's feeling, based on the controllability, into ten ranks wherein the higher the rank number, the better the performance.

TABLE 1

| Tire | Ref. | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- |
| Recess | none | FIG. 4 | FIG. 4 | FIG. 4 | FIG. 4 | FIG. 5 | FIG. 5 | FIG. 6 | FIG. 7 |
| Type | — | groove | groove | groove | groove | groove | groove | 6 mm dia. circle | 5 × 7 mm rectangle |
| Depth d (mm) | — | 1 | 2 | 3 | 3 | 1 | 2 | 3 | 3 |
| Width W (mm) | 0 | 5 | 5 | 5 | 6 | 2.5 | 2.5 | 6 | 5 |
| Number of groove | 0 | 1 | 1 | 1 | 1 | 2 | 2 | — | — |
| Holes' pitch (mm) | — | — | — | — | — | — | — | 10 | 10 |
| Vg/Va (%) | 0 | 5.7 | 11.4 | 17.1 | 20.6 | 5.7 | 11.4 | 12 | 12 |
| Tire weight | 100 | 100 | 99.7 | 99.5 | 99.4 | 100 | 99.7 | 99.7 | 99.6 |
| Stone entrapment | 100 | 120 | 140 | 160 | 160 | 140 | 165 | 120 | 135 |
| Steering stability | 6 | 6 | 6 | 6 | 6 | 7 | 7 | 6.5 | 6.5 |

The invention claimed is:

1. A pneumatic tire comprising:
a tread portion,
a pair of bead portions adapted to a wheel rim,
a pair of sidewall portions therebetween, at least one of the sidewall portions being provided with an axially protruding rim protector, wherein the rim protector extends continuously in the tire circumferential direction so as to form
an annular axially outer surface extending continuously in the tire circumferential direction;
a radially inner surface extending radially inwardly from said annular axially outer surface towards the adjacent bead portion, wherein the radially inner surface is provided along the tire circumferential direction with at least one recess having a depth of from 0.5 to 7.0 mm, and
wherein said radially inner surface comprises a radially outer part, a middle part and a radially inner part, the middle part has a radius R1 of curvature in the range of from 1.5 to 4 times a radius Rf of curvature of a convex surface of the flange, the radially outer part has a radius R2 of curvature smaller than the radius R1, and the radially inner part has a radius R3 of curvature smaller than the radius R1.

2. A pneumatic tire according to claim 1, wherein said at least one recess is a single groove extending continuously in the tire circumferential direction.

3. A pneumatic tire according to claim 1, wherein said at least one recess is a plurality of parallel grooves each extending continuously in the tire circumferential direction.

4. A pneumatic tire according to claim 1, wherein said at least one recess is a plurality of circumferentially arranged holes.

5. A pneumatic tire according to claim 1, wherein the axially outer edge of said radially inner surface is positioned at an axial distance L1 of not more than 10 mm but more than 0 mm from the axial extreme end of a flange of the wheel rim, and at a radial distance L2 of from 2 to 15 mm from the radial extreme end of the flange.

6. A pneumatic tire according to claim 1, wherein said radially inner surface comprises a middle part having a radius of curvature larger than a radius Rf of curvature of a convex surface of the flange.

7. A pneumatic tire according to claim 1, wherein the radius R3 of the radially inner part is substantially the same as the radius Rf of the flange.

* * * * *